US009753359B2

(12) United States Patent
Ogura et al.

(10) Patent No.: US 9,753,359 B2
(45) Date of Patent: Sep. 5, 2017

(54) PROJECTION APPARATUS INCLUDING A NOISE REDUCTION MECHANISM PROVIDED BETWEEN A LIGHT SOURCE AND AN IMAGE DISPLAY ELEMENT

(71) Applicants: CASIO COMPUTER CO., LTD., Shibuya-ku, Tokyo (JP); TOYODA GOSEI CO., LTD., Kiyosu-shi, Aichi-ken (JP)

(72) Inventors: Naotsugu Ogura, Hamura (JP); Kazumasa Baba, Kiyosu (JP); Hiromitsu Takeuchi, Kiyosu (JP)

(73) Assignees: CASIO COMPUTER CO., LTD., Tokyo (JP); TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 30 days.

(21) Appl. No.: 14/867,818

(22) Filed: Sep. 28, 2015

(65) Prior Publication Data
US 2016/0091728 A1    Mar. 31, 2016

(30) Foreign Application Priority Data

Sep. 29, 2014    (JP) .................................. 2014-197940

(51) Int. Cl.
*G03B 21/14*    (2006.01)
*G02B 27/48*    (2006.01)
(Continued)

(52) U.S. Cl.
CPC ......... *G03B 21/14* (2013.01); *G02B 27/0927* (2013.01); *G02B 27/48* (2013.01); *H04N 9/3152* (2013.01); *H04N 9/3161* (2013.01)

(58) Field of Classification Search
CPC .. G02B 27/0927; G02B 27/48; H04N 9/3152; H04N 9/3161; G03B 21/14
See application file for complete search history.

(56) References Cited

U.S. PATENT DOCUMENTS 5,313,479 A    5/1994  Florence
9,488,849 B2   11/2016  Shimizu et al.
(Continued)

FOREIGN PATENT DOCUMENTS

CN    1967314 A    5/2007
CN    102667616 A  9/2012
(Continued)

OTHER PUBLICATIONS

Chinese Office Action (and English translation thereof) dated Oct. 26, 2016, issued in counterpart Chinese Application No. 201510629902.6.

*Primary Examiner* — Sultan Chowdhury
*Assistant Examiner* — Magda Cruz
(74) *Attorney, Agent, or Firm* — Holtz, Holtz & Volek PC

(57) ABSTRACT

A projection apparatus includes a light source to emit a light beam, an image display element to provide image information to the light beam, and a noise reduction mechanism disposed between the light source and the image display element. The noise reduction mechanism includes an optical element to transmit the light beam emitted from the light source, a dielectric elastomer fixed to the optical element, and first and second electrodes provided on first and second surfaces of the dielectric elastomer, respectively. The dielectric elastomer is deformed in accordance with the application of a voltage across the first and second electrodes to moves the optical element.

4 Claims, 11 Drawing Sheets

(51) Int. Cl.
*H04N 9/31* (2006.01)
*G02B 27/09* (2006.01)

(56) References Cited

U.S. PATENT DOCUMENTS

| | | |
|---|---|---|
| 9,500,780 B2 | 11/2016 | Oiwa et al. |
| 2006/0028742 A1* | 2/2006 | Yamashita ............... G02B 7/08 359/819 |
| 2007/0122132 A1 | 5/2007 | Misawa et al. |
| 2012/0242960 A1* | 9/2012 | Oiwa .................... G02B 27/48 353/31 |

FOREIGN PATENT DOCUMENTS

| | | | |
|---|---|---|---|
| JP | 06208089 A | 7/1994 | |
| JP | 4682528 B2 | 5/2011 | |
| JP | 2013171172 A | 9/2013 | |
| WO | WO 2009104122 A1 * | 8/2009 | ................ A63J 5/02 |

* cited by examiner

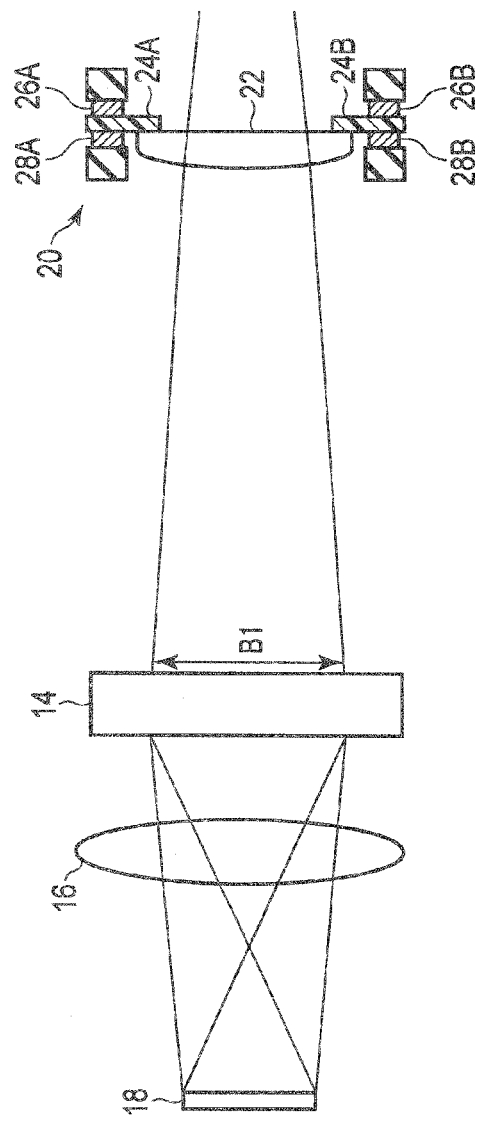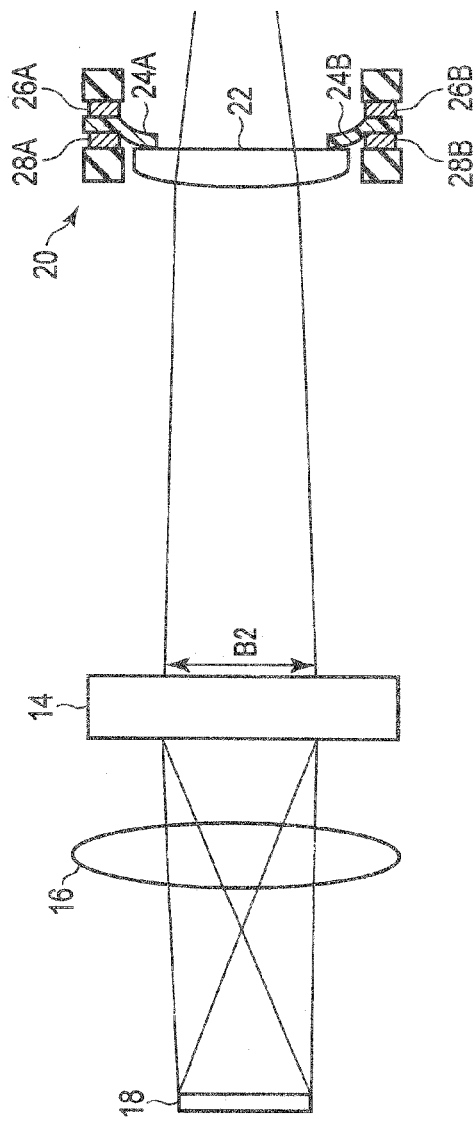

US 9,753,359 B2

PROJECTION APPARATUS INCLUDING A NOISE REDUCTION MECHANISM PROVIDED BETWEEN A LIGHT SOURCE AND AN IMAGE DISPLAY ELEMENT

CROSS-REFERENCE TO RELATED APPLICATIONS

This application is based upon and claims the benefit of priority from Japanese Patent Application No. 2014-197940, filed Sep. 29, 2014, the entire contents of which are incorporated herein by reference.

BACKGROUND OF THE INVENTION

1. Field of the Invention

The present invention relates to a projection apparatus.

2. Description of the Related Art

Projection apparatuses include a projector using a semiconductor laser as a light source. If laser light is projected as it is in such a projector, diffraction fringes attributed to diffraction phenomena are generated because of the coherent characteristics of the laser light, or since the laser light is reflected by minute projections and depressions on a projection surface, interference and generate speckles are caused. Such diffraction fringes and speckles considerably deteriorate the quality of projected images.

According to known techniques for reducing diffraction fringes and speckles, laser light is converted into incoherent light by rotating a diffuser plate as shown in Jpn. Pat. Appln. KOKAI Publication No. 6-208089 or by vibrating the diffuser plate as shown in Japanese Patent No. 4682528.

However, when the rotary diffuser plate is disposed on the optical path of the laser as in Jpn. Pat. Appln. KOKAI Publication No. 6-208089, a part of the diffuser plate is only used, and the other part is not used, so that a wasteful mounting volume is taken up. When an actuator to drive the diffuser plate uses electromagnetic force as in Jpn. Pat. Appln. KOKAI Publication No. 6-208089 and Japanese Patent No. 4682528, the increase of power consumption for current driving is a problem.

BRIEF SUMMARY OF THE INVENTION

In view of the above-described actual situation, an object of the present invention is to provide a projection apparatus including a new mechanism to reduce diffraction fringes and speckles.

A projection apparatus according to the present invention includes a light source to emit a light beam, an image display element to provide image information to the light beam, and a noise reduction mechanism disposed between the light source and the image display element. The noise reduction mechanism includes an optical element to transmit the light beam emitted from the light source, a dielectric elastomer fixed to the optical element, and first and second electrodes provided on first and second surfaces of the dielectric elastomer, respectively. The dielectric elastomer is deformed in accordance with the application of a voltage across the first and second electrodes to moves the optical element.

According to the present invention, a projection apparatus including a new mechanism to reduce diffraction fringes and speckles is provided.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 5a and 5b show the operation in a projection apparatus of the noise reduction mechanism according to the first embodiment;

DETAILED DESCRIPTION OF THE INVENTION

Hereinafter, embodiments of the present invention will be described with reference to the drawings.

First Embodiment

Figure 1:
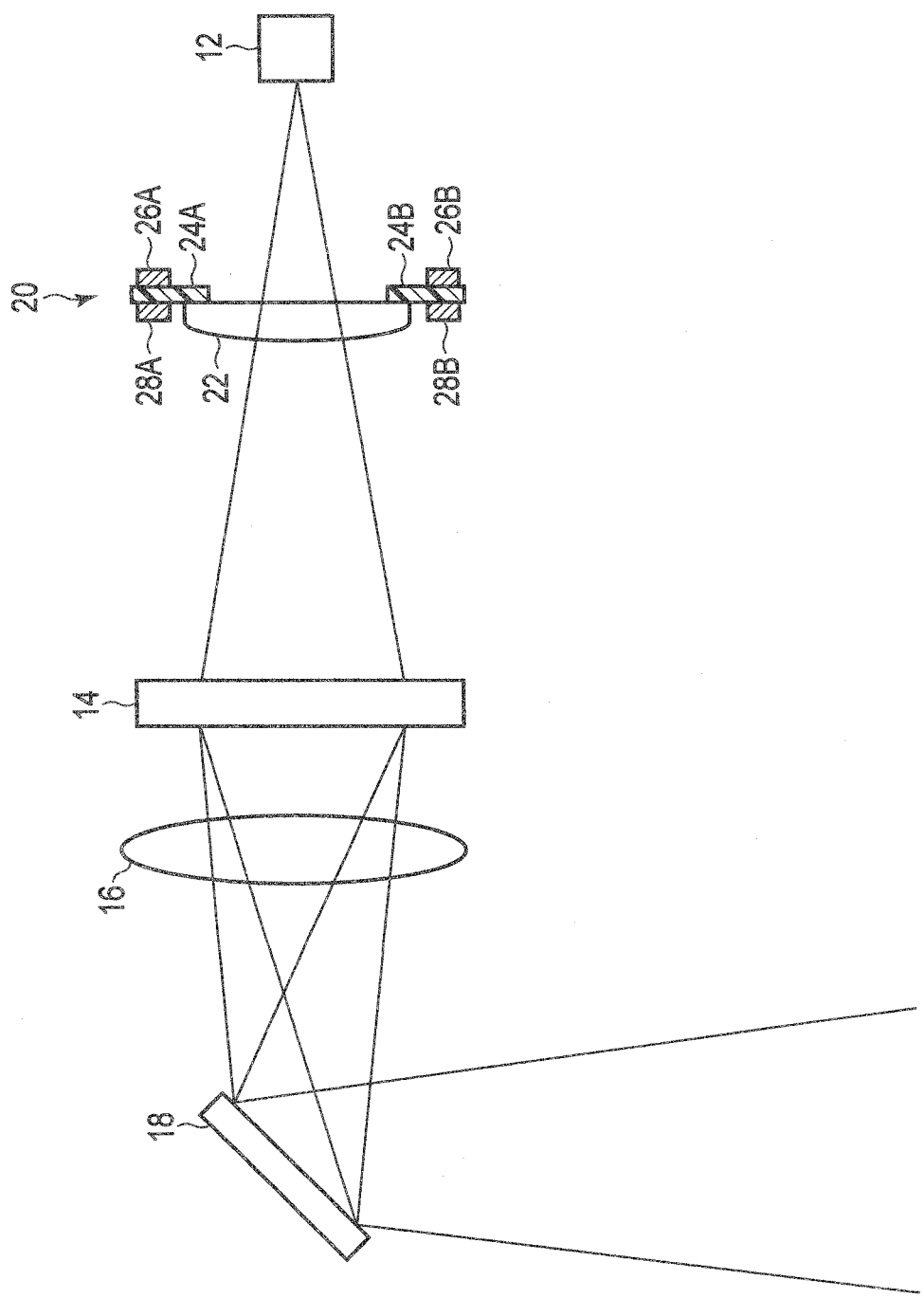
FIG. 1 schematically shows a projection apparatus according to an embodiment.

A projection apparatus according to the present embodiment is schematically shown in FIG. 1. The projection apparatus comprises a light source 12 to emit a light beam, a microlens array 14 to convert the light beam emitted from the light source 12 into a light beam having a substantially uniform intensity distribution, a collecting lens 16 to converge the light beam that has passed through the microlens array 14, and an image display element 18 to provide image information to the light beam.

The light source 12 comprises a laser light source such as a semiconductor laser. The image display element 18 comprises, for example, a digital micromirror device (registered trademark). The image display element 18 has a rectangular reflection region, and the microlens array 14 has a function of forming the light beam in accordance with the reflection region.

The image display element 18 has a great number of deflectable reflection elements arrayed in matrix form. Each of the reflection elements can switch between an on-state reflect an incoming beam along a projection direction and an off-state to reflect an incoming beam out of the projection direction. The reflection elements of the image display element 18 are switched between the on-state and the off-state in accordance with an image signal to be supplied, and thereby provide binary information regarding a display image to a reflected light beam. The reflection elements are further switched a great number of times in one frame, and thereby provide tone information regarding the display image to the reflected light beam.

In such a projection apparatus, the light beam emitted from the light source 12 is changed into a light beam having a substantially uniform intensity distribution by the microlens array 14, converged by the collecting lens 16, and enters the image display element 18. The light beam that has entered the image display element 18 is provided with the image information, reflected, and projected.

Figure 2:
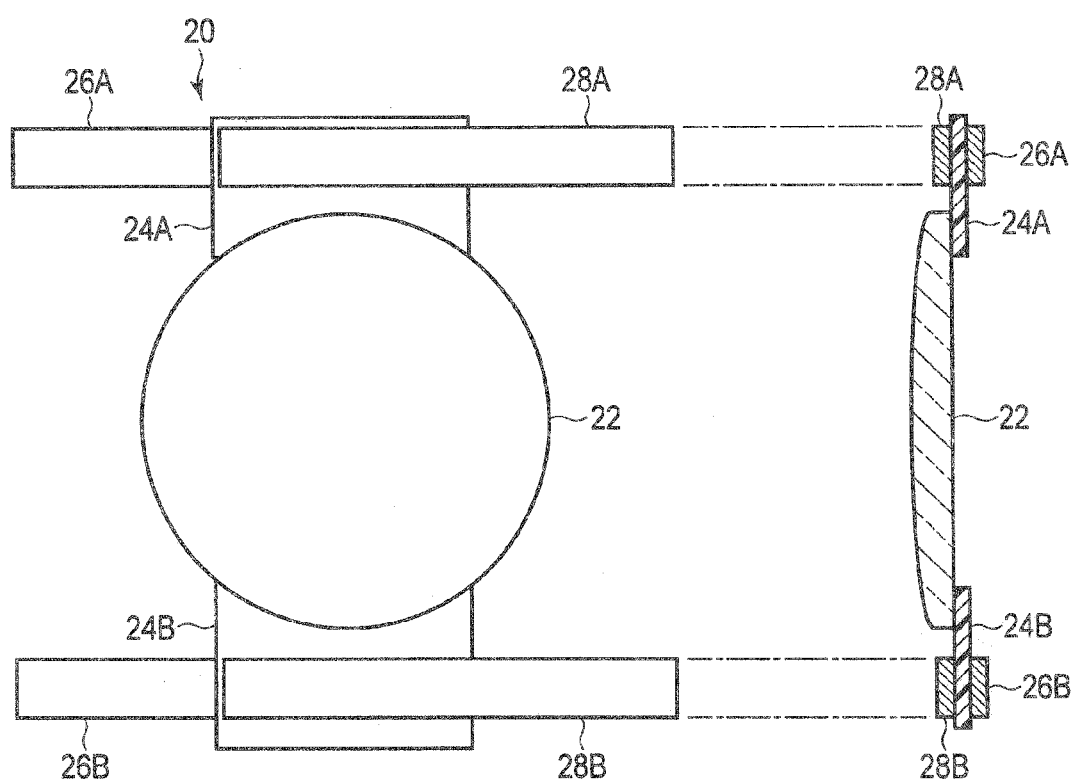
FIG. 2 shows, in enlarged form, a noise reduction mechanism shown in FIG. 1.

The projection apparatus further comprises, between the light source 12 and the microlens array 14, a noise reduction mechanism 20 to reduce noise such as diffraction fringes and speckles. The noise reduction mechanism 20 shown in FIG. 1 is enlarged in FIG. 2.

The noise reduction mechanism 20 comprises an optical element 22 to transmit the light beam emitted from the light source 12, two dielectric elastomers 24A and 24B, fixed to the optical element 22, to generate high strain according to an electric field, first electrodes 26A and 26B provided on first surfaces of the dielectric elastomers 24A and 24B, and second electrodes 28A and 28B provided on second surfaces of the dielectric elastomers 24A and 24B.

The dielectric elastomers 24A and 24B have different configurations in regions that are between the first electrodes 26A and 26B and the second electrodes 28A and 28B and regions that are not between the electrodes and project toward the optical element 22.

Each of the regions of the dielectric elastomers 24A and 24B that are between the first electrodes 26A and 26B and the second electrodes 28A and 28B have a structure in which electrically conducting rubber layers having electrically conducting powder of, for example, carbon mixed in, for example, silicone rubber are stacked on both surfaces of an electrically conducting rubber layer. The regions of the dielectric elastomers 24A and 24B that are not between the first electrodes 26A and 26B and the second electrodes 28A and 28B and project toward the optical element 22 only comprise insulating rubber layers. The insulating rubber layers are adhesively bonded to the optical element 22.

The optical element 22 may be, for example, a lens, a diffuser plate, or a glass flat plate. The dielectric elastomers 24A and 24B can be made of, for example, a high polymer compound having a movable cross linking point. Such a high polymer compound may be, for example, polyrotaxane. Each of the dielectric elastomers 24A and 24B may be, for example, a plate having a pair of parallel planes facing each other. One of the parallel planes of each of the dielectric elastomers 24A and 24B is fixed to the edge of the optical element 22 in contact with a surface of the optical element 22, and projects and extends to the outside of the optical element 22. The first surface and the second surface of each of the dielectric elastomers 24A and 24B on which the first electrodes 26A and 26B and the second electrodes 28A and 28B are provided may be a pair of parallel planes of the dielectric elastomers 24A and 24B, respectively.

The two dielectric elastomers 24A and 24B are arranged highly symmetrically with respect to the optical element 22, for example, arranged symmetrically with respect to the optical center of the optical element 22. The dielectric elastomers 24A and 24B may be adhesively bonded to one end side and the other end side of the other surface of the optical element 22 by, for example, double-sided tapes, respectively.

For example, the first electrodes 26A and 26B may be used as GND electrodes, and the second electrodes 28A and 28B may be used as positive electrodes. Each of the dielectric elastomers 24A and 24B has characteristics of being deformed, more specifically, characteristics of contracting in the thickness direction and extending in a surface direction that intersects at right angles with the thickness direction in accordance with the application of voltages across the first electrodes 26A and 26B and the second electrodes 28A and 28B.

Figure 3:
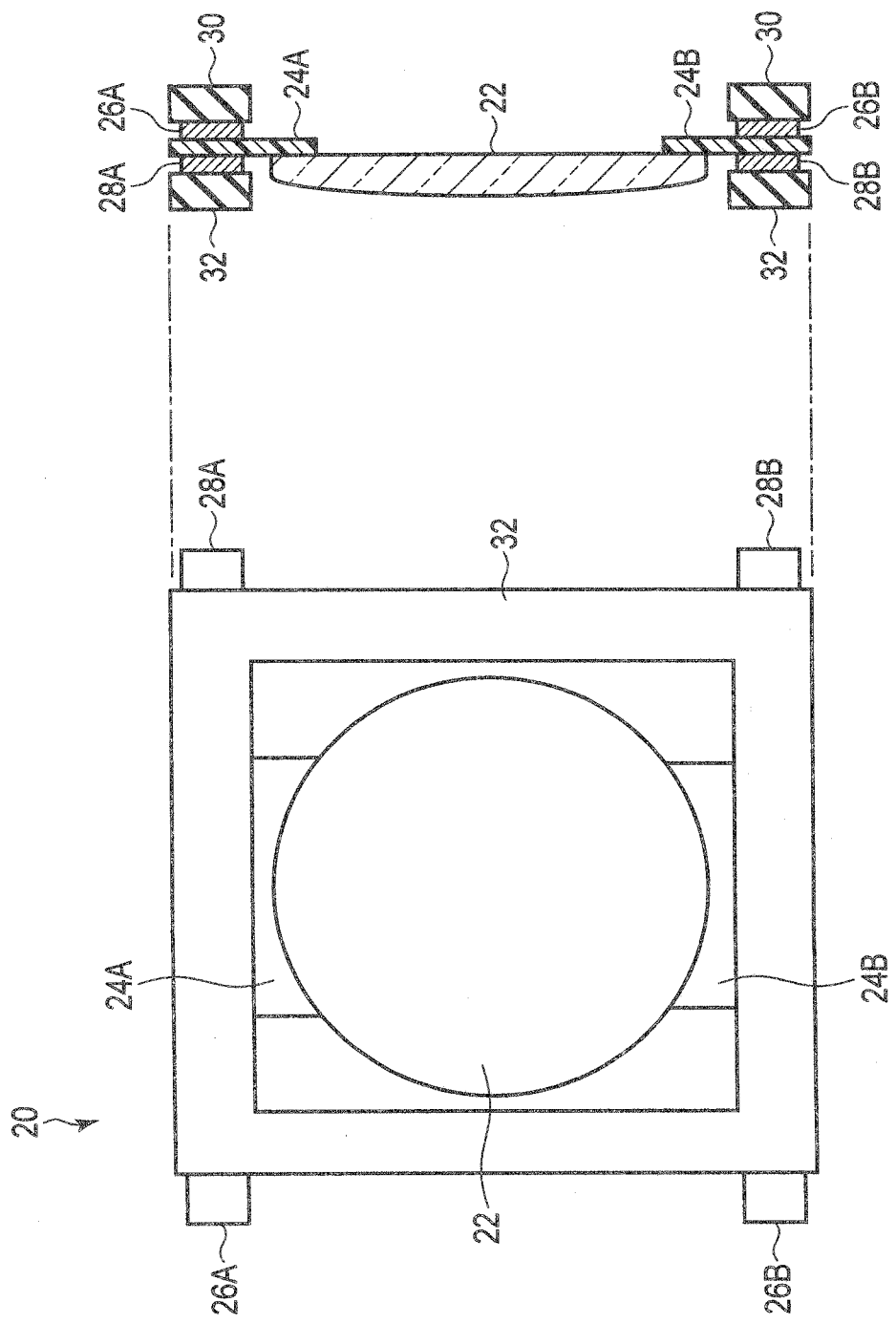
FIG. 3 shows a noise reduction mechanism according to a first embodiment configured as a single device.

The noise reduction mechanism 20 may be directly attached to, for example, the housing of the projection apparatus, but may be configured as an independent single device. The noise reduction mechanism 20 according to the present embodiment configured as a single device is shown in FIG. 3. In this configuration example, the noise reduction mechanism 20 has a first frame 30 and a second frame 32 holding the first electrodes 26A and 26B and the second electrodes 28A and 28B, respectively. The first and second frames 30 and 32 directly contact the first electrodes 26A and 26B and the second electrodes 28A and 28B and may therefore be made of an insulator of, for example, a resin. Alternatively, the first and second frames 30 and 32 may be made of a metal in which insulating coatings are formed on the surfaces that contact the first electrodes 26A and 26B and the second electrodes 28A and 28B.

Figure 4A:
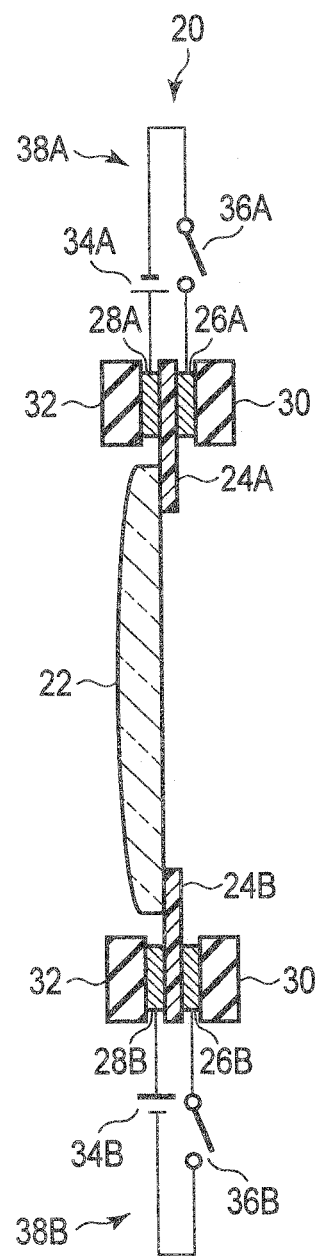
FIGS. 4a and 4b show the operation of the noise reduction mechanism according to the first embodiment.
Figure 4B:
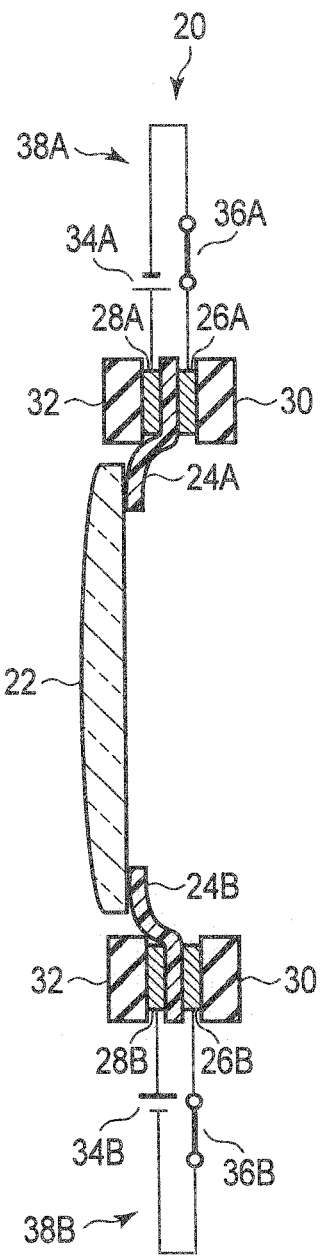

The operation of the noise reduction mechanism 20 according to the present embodiment is shown in FIGS. 4a and 4b. Electrodes 34A and 34B and switches 36A and 36B are electrically connected in series between the first electrodes 26A and 26B and the second electrodes 28A and 28B, respectively. In other words, the noise reduction mechanism 20 also has current-carrying circuits 38A and 38B to apply voltages to the dielectric elastomers 24A and 24B as required.

In the state shown in FIG. 4a, the switches 36A and 36B are off, in other words, the current-carrying circuits 38A and 38B are off, and no voltages are applied to the dielectric elastomers 24A and 24B. This state will hereinafter be referred to as an initial state. If the switches 36A and 36B are turned on as shown in FIG. 4b, voltages are applied to the dielectric elastomers 24A and 24B, so that the dielectric elastomers 24A and 24B expand in a plane direction. As a result, the optical element 22 is moved along the optical axis in contrast to the initial state. This state will hereinafter be referred to as a displacement state.

Figure 6A:
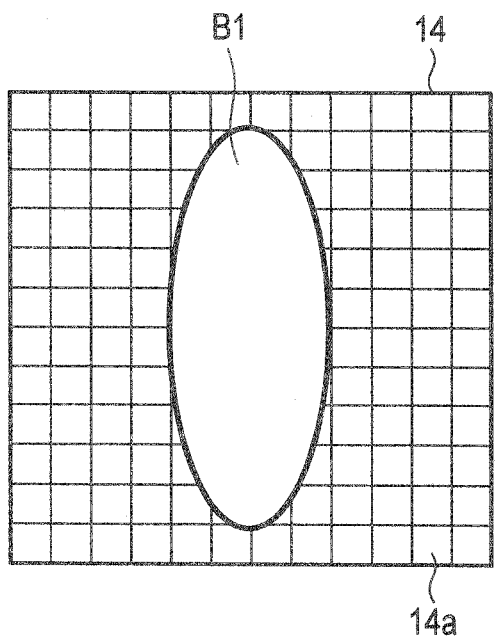
FIGS. 6a and 6b show beam spots formed on a microlens array shown in FIGS. 5a and 5b.
Figure 6B:
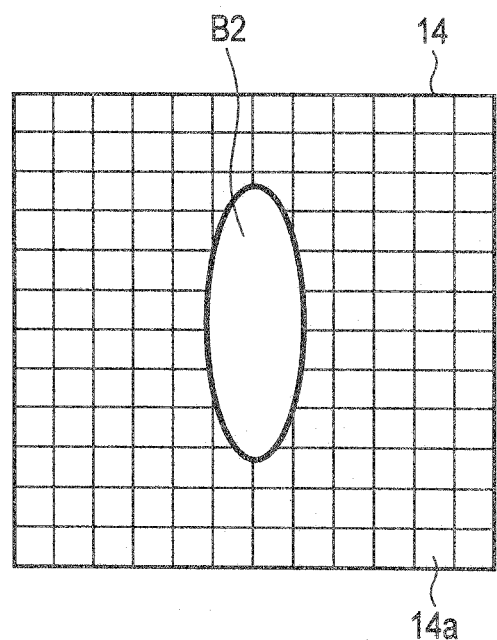

The operation in the projection apparatus of the noise reduction mechanism 20 according to the present embodiment is shown in FIGS. 5a and 5b. Beam spots formed on the microlens array 14 are shown in FIGS. 6a and 6b. In FIGS. 5a and 5b, the optical element 22 is represented as an optical element having optical power, for example, an optical element having positive optical power, for example, a plano-convex lens. To assist in understanding the operation, the change of a beam diameter associated with the positional change of the optical element 22 is exaggerated.

As shown in FIG. 5a and FIG. 6a, in the initial state in which no voltages are applied to the dielectric elastomers 24A and 24B, the light beam that has passed through the optical element 22 forms a beam spot B1 on the microlens array 14. In contrast, as shown in FIG. 5b and FIG. 6b, in the state in which voltages are applied to the dielectric elastomers 24A and 24B, the optical element 22 is moved toward the microlens array 14 along the optical axis, so that the light beam that has passed through the optical element 22 forms a beam spot B2 smaller than the beam spot B1 on the microlens array 14.

Thus, the current-carrying circuits 38A and 38B simultaneously turn on and off the application of voltages the dielectric elastomers 24A and 24B when the switches 36A and 36B are simultaneously turned on and off, so that the optical element 22 is moved, for example, translated, and the region of the microlens array 14 where the projected light beam passes, i.e., the number of microlenses 14a where the projected light beam passes changes.

When the switches 36A and 36B are repeatedly turned on and off at the same time, i.e., when the current-carrying circuits 38A and 38B repeatedly turn on and off the application of voltages to the dielectric elastomers 24A and 24B at the same time, the initial state and the displacement state alternate, and the region of the microlens array 14 where the projected light beam passes is enlarged and reduced. Therefore, diffraction fringes and speckles are uniformed, and are thus less visually recognized. That is, noise such as diffraction fringes and speckles is reduced. The period of turning on and off the switches 36A and 36B is preferably 60 hertz or more.

Second Embodiment

The configuration of the projection apparatus according to the second embodiment is the same as that according to the first embodiment, but the operation of the noise reduction mechanism 20 is different from that according to the first embodiment. In the present embodiment, the surface of the optical element 22 to which the dielectric elastomers 24A and 24B are fixed is different, and the operations of the current-carrying circuits 38A and 38B are different. The operation of the noise reduction mechanism 20 in the present embodiment is shown in FIGS. 7a, 7b, and 7c.

Figure 7A:
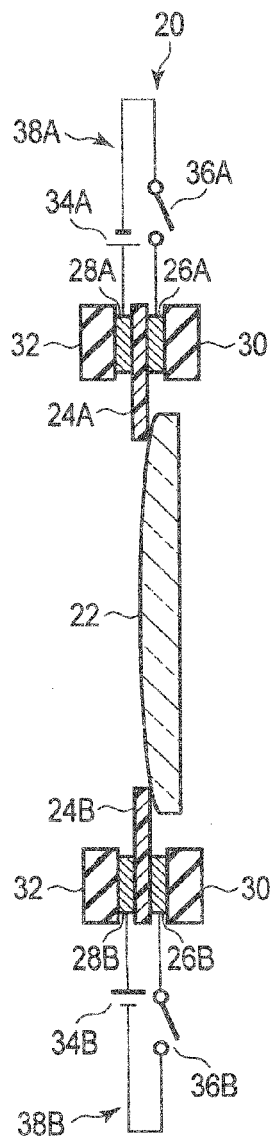
FIGS. 7a, 7b, and 7c show the operation of a noise reduction mechanism according to a second embodiment.

In the state shown in FIG. 7a, the switches 36A and 36B are off, in other words, the current-carrying circuits 38A and 38B are off, and no voltages are applied to the dielectric elastomers 24A and 24B. This state will hereinafter be referred to as an initial state.

Figure 7B:
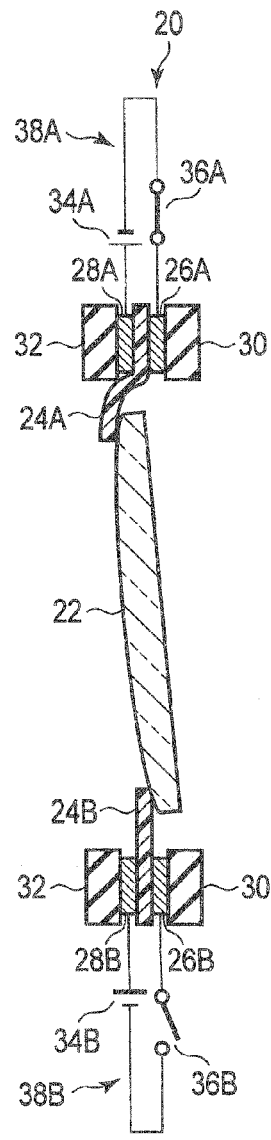

If the switch 36A alone is turned on from the initial state as shown in FIG. 7b, a voltage is applied to the dielectric elastomer 24A alone. Therefore, the dielectric elastomer 24B remains the same, but the dielectric elastomer 24A expands in the plane direction. As a result, the optical element 22 is inclined, for example, about 3° counterclockwise when seen from its section in contrast to the initial state. This state will hereinafter be referred to as a positive inclination state.

Figure 7C:
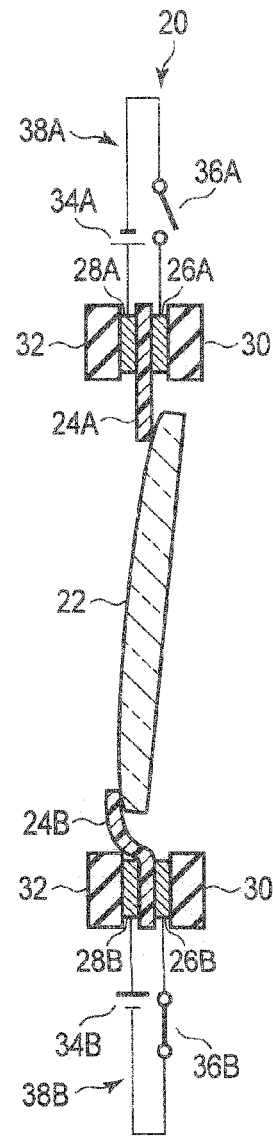

In contrast, if the switch 36B alone is turned on from the initial state as shown in FIG. 7c, a voltage is applied to the dielectric elastomer 24B alone. Therefore, the dielectric elastomer 24A remains the same, but the dielectric elastomer 24B expands in the plane direction. As a result, the optical element 22 is inclined, for example, about 3° clockwise when seen from its section in contrast to the initial state. This state will hereinafter be referred to as a negative inclination state.

Figure 8A:
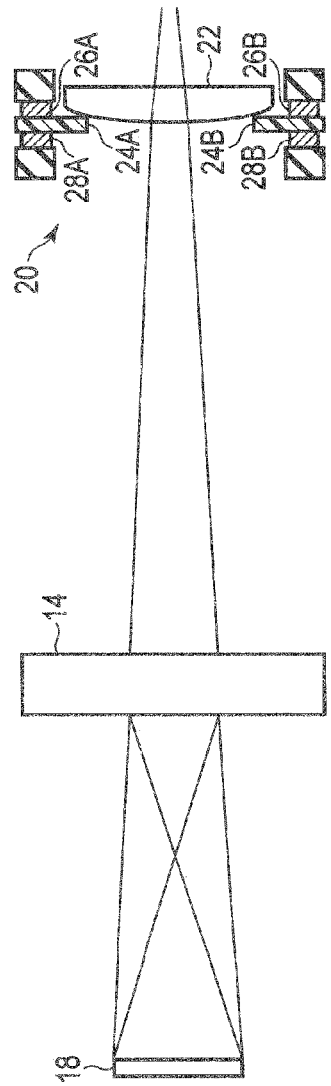
FIGS. 8a, 8b, and 8c show the operation in a projection apparatus of the noise reduction mechanism according to the second embodiment.
Figure 8B:
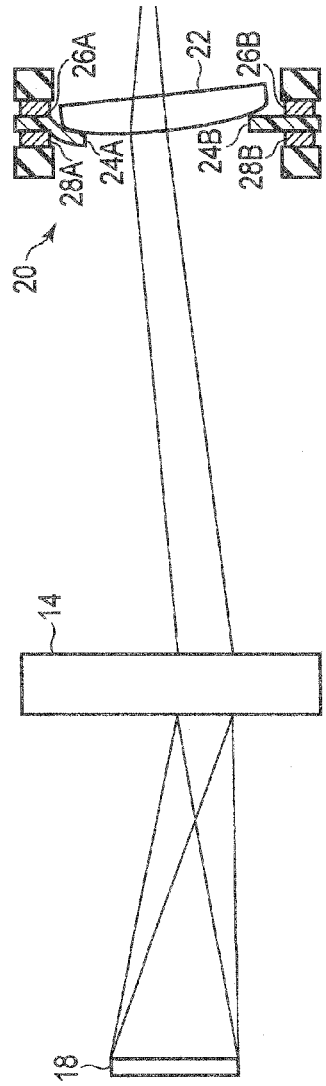
Figure 8C:
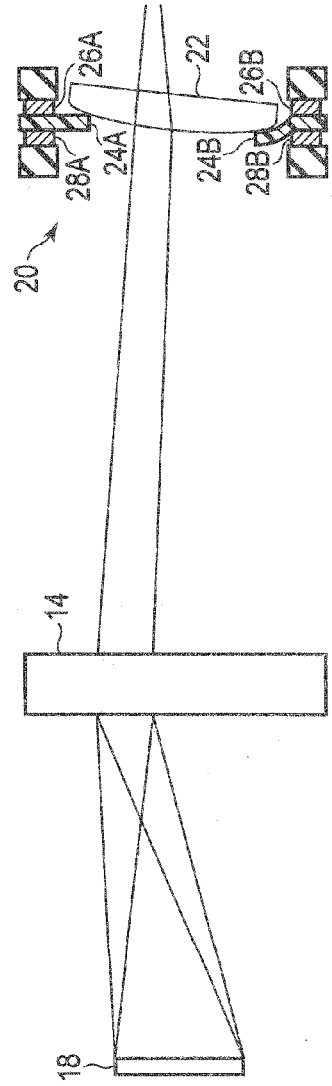
Figure 9A:
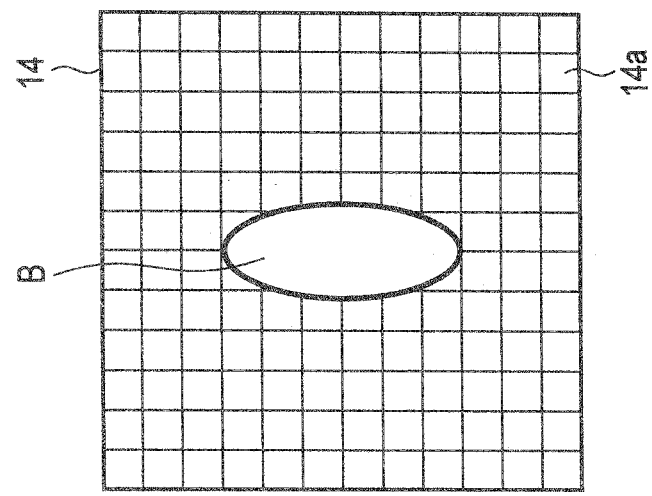
FIGS. 9a, 9b, and 9c show beam spots formed on a microlens array shown in FIGS. 8a, 8b, and 8c.
Figure 9B:
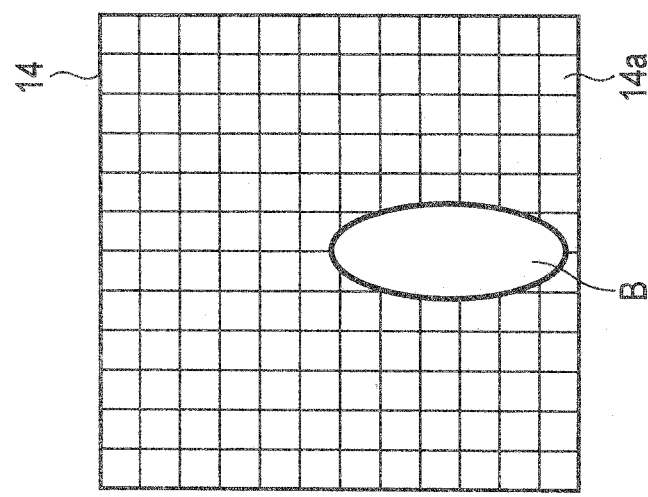
Figure 9C:
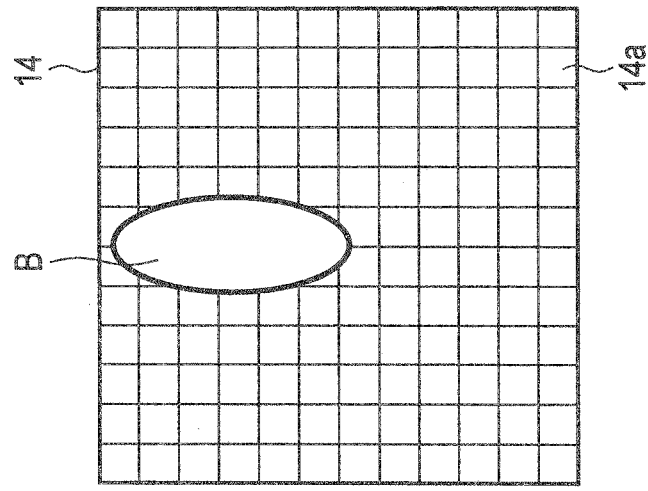

The operation in the projection apparatus of the noise reduction mechanism 20 according to the present embodiment is shown in FIGS. 8a, 8b, and 8c. Beam spots formed on the microlens array 14 are shown in FIGS. 9a, 9b, and 9c. In FIGS. 8a, 8b, and 8c, the optical element 22 is represented as an optical element having positive optical power, for example, a plano-convex lens. To assist in understanding the operation, the change of the direction of a beam associated with the inclination change of the optical element 22 is exaggerated.

As shown in FIG. 8a and FIG. 9a, in the initial state in which no voltages are applied to the dielectric elastomers 24A and 24B, the light beam that has passed through the optical element 22 forms a beam spot B substantially in the center of the microlens array 14.

As shown in FIG. 8b and FIG. 9b, in the positive inclination state in which a voltage is applied to the dielectric elastomer 24A, the optical element 22 is inclined counterclockwise, so that the light beam that has passed through the optical element 22 forms the beam spot B in the lower position of the microlens array 14 in contrast to the initial state.

As shown in FIG. 8c and FIG. 9c, in the negative inclination state in which a voltage is applied to the dielectric elastomer 24B, the optical element 22 is inclined clockwise, so that the light beam that has passed through the optical element 22 forms the beam spot B in the upper position of the microlens array 14 in contrast to the initial state.

Thus, when one of the switches 36A and 36B is turned on, a voltage is applied to corresponding one of the dielectric elastomers 24A and 24B, so that the optical element 22 is moved, for example, inclined, and the position of the microlens array 14 where the projected light beam passes, i.e., the microlenses 14a where the projected light beam passes changes.

When the switches 36A and 36B are alternately and repeatedly turned on, i.e., when the current-carrying circuits 38A and 38B alternately repeat intermittent application of voltages to the dielectric elastomers 24A and 24B, the positive inclination state in which the optical element 22 is inclined counterclockwise and the negative inclination state in which the optical element 22 is inclined clockwise repeatedly appear, and the optical element 22 is flapped up and down relative to the optical axis. Thus, the beam spot B is scanned on the microlens array 14 up and down. As a result, the position of the microlens array 14 where the projected light beam passes continuously changes, so that diffraction fringes and speckles are uniformed, and are thus less visually recognized. That is, noise such as diffraction fringes and speckles is reduced.

In the present embodiment, in contrast to the first embodiment, the change of the microlenses 14a where the projected light beam passes is greater, and a higher effect of reducing noise such as diffraction fringes and speckles is easily obtained.

Although the optical element 22 described here is a plano-convex lens, similar advantageous effects are obtained if the optical element 22 is an optical element having no optical power, for example, a transparent parallel flat plate.

Although the current-carrying circuits 38A and 38B alternately turn on and off the application of voltages to the dielectric elastomers 24A and 24B in the operation example described, only one of the current-carrying circuits 38A and 38B may turn on and off the application of voltages to corresponding one of the dielectric elastomers 24A and 24B. In this case as well, similar noise reduction effects can be obtained. In other words, the noise reduction mechanism 20 does not always need to comprise a pair of dielectric elastomers 24A and 24B, a pair of first electrodes 26A and 26B, and a pair of second electrodes 28A and 28B, and has only to comprise at least one of the pair of dielectric elastomers 24A and 24B, at least one of the pair of first electrodes 26A and 26B, and at least one of the pair of second electrodes 28A and 28B. That is, the noise reduction mechanism 20 may be configured so that one of the pair of dielectric elastomers 24A and 24B, one of the pair of first electrodes 26A and 26B, and one of the pair of second electrodes 28A and 28B are replaced by supports of, for example, a resin elastically supporting the optical element 22.

Third Embodiment

Figure 10:
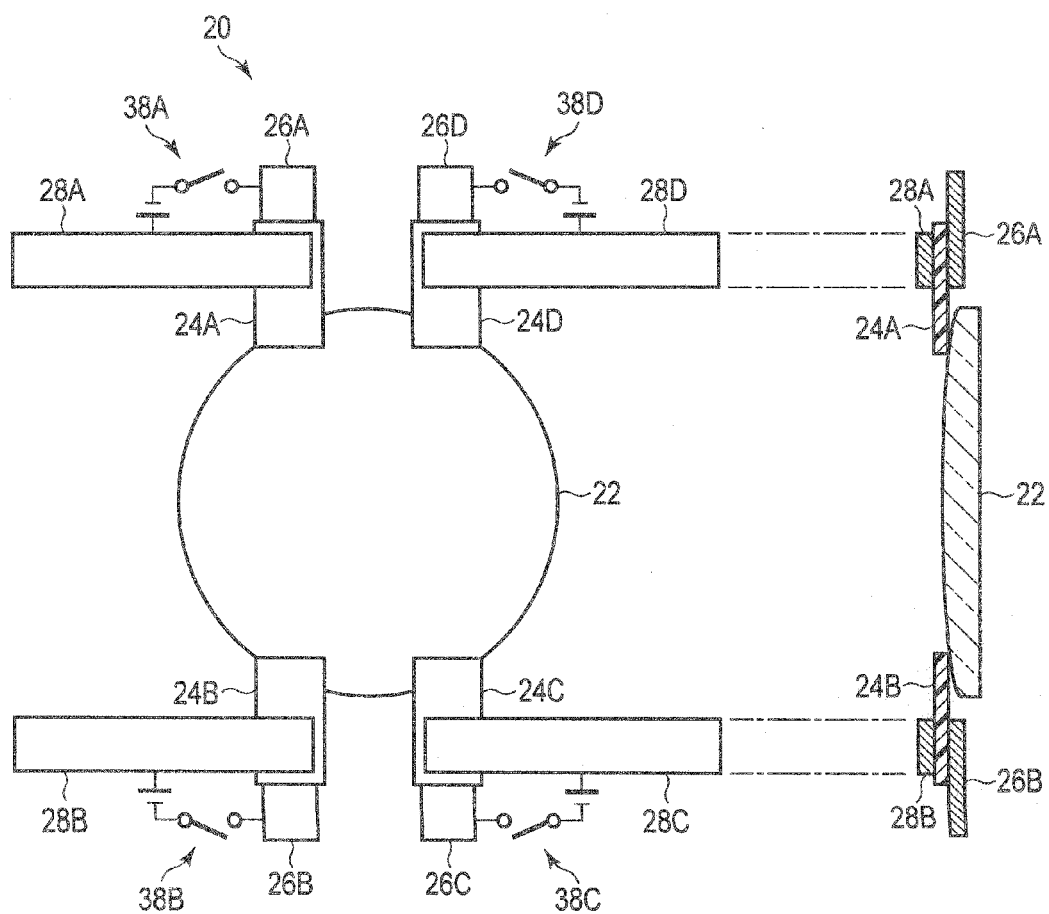
FIG. 10 shows a noise reduction mechanism according to a third embodiment.

The third embodiment relates to another noise reduction mechanism that can replace the noise reduction mechanism shown in FIG. 1. The noise reduction mechanism 20 according to the third embodiment is shown in FIG. 10.

The noise reduction mechanism 20 according to the present embodiment comprises the optical element 22, four dielectric elastomers 24A, 24B, 24C, and 24D fixed to the optical element 22, first electrodes 26A, 26B, 26C, and 26D each provided on one surface of each of the dielectric elastomers 24A, 24B, 24C, and 24D, and second electrodes 28A, 28B, 28C, and 28D each provided on the other surface of each of the dielectric elastomers 24A, 24B, 24C, and 24D.

The dielectric elastomers 24A, 24B, 24C, and 24D are, for example, arranged highly symmetrically with respect to the optical center of the optical element 22. For example, the dielectric elastomers 24A and 24B and the dielectric elastomers 24D and 24C are arranged line-symmetrically with respect to the center of the optical element 22, and the dielectric elastomers 24A and 24D and the dielectric elastomers 24B and 24C are arranged line-symmetrically with respect to the center of the optical element 22. The first electrodes 26A, 26B, 26C, and 26D may be used as GND electrodes, and the second electrodes 28A, 28B, 28C, and 28D may be used as positive electrodes. Each of the dielectric elastomers 24A, 24B, 24C, and 24D has characteristics of being deformed, more specifically, characteristics of contracting in the thickness direction and extending in a surface direction that intersects at right angles with the thickness direction in accordance with the application of voltages across the first electrodes 26A, 26B, 26C, and 260 and the second electrodes 28A, 28B, 28C, and 28D.

Current-carrying circuits 38A, 38B, 38C, and 38D similar to those described in the first embodiment may be connected to the first electrodes 26A, 26B, 26C, and 26D and the second electrodes 28A, 28B, 28C, and 28D, respectively. That is, the noise reduction mechanism 20 may have four current-carrying circuits 38A, 38B, 38C, and 38D to apply voltages to four dielectric elastomers 24A, 24B, 24C, and 24D as required, respectively.

Beam spots formed on the microlens array in the present embodiment are shown in FIGS. 11*a*, 11*b*, 11*c*, and 11*d*.

Figure 11A:
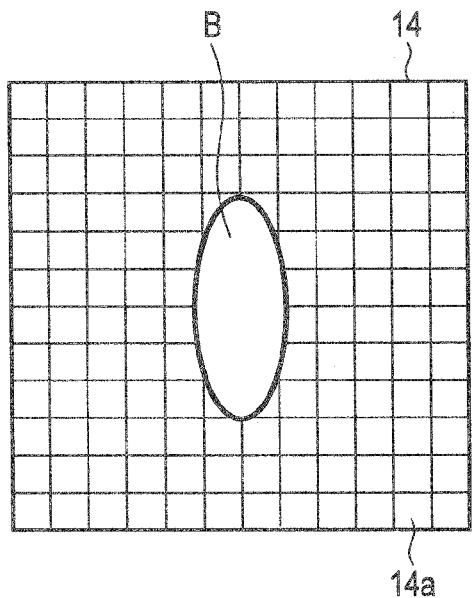
FIGS. 11a, 11b, 11c, and 11d show beam spots formed on a microlens array in the third embodiment.

In the state in which voltages are applied to none of the dielectric elastomers 24A, 24B, 24C, and 24D, the projected light beam that, has passed through the optical element 22 forms the beam spot B substantially in the center of the microlens array 14 as shown in FIG. 11*a*.

Figure 11B:
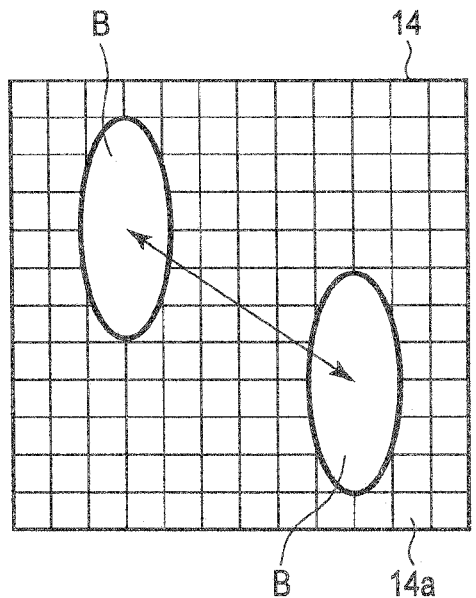

In one example, voltages may be alternately applied to the dielectric elastomers 24A and 24C. In this case, the optical element 22 is flapped in a rightwardly downward oblique direction in FIG. 10 relative to the optical axis. Thus, as shown in FIG. 11*b*, the beam spot B is reciprocally scanned on the microlens array 14 straight in the rightwardly downward oblique direction.

Figure 11C:
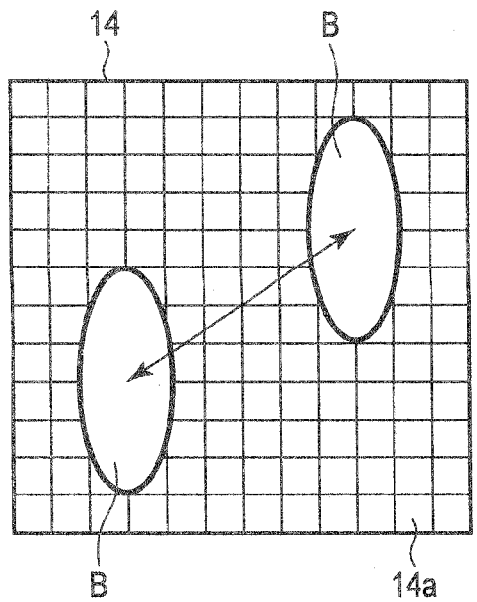

In another example, voltages may be alternately applied to the dielectric elastomers 24B and 24D. The optical element 22 is flapped in a rightwardly upward oblique direction in FIG. 10 relative to the optical axis. Thus, as shown in FIG. 11*c*, the beam spot B is reciprocally scanned on the microlens array 14 straight in the rightwardly upward oblique direction.

In each case, the position of the microlens array 14 where the projected light beam passes continuously changes, so that diffraction fringes and speckles are uniformed, and are thus less visually recognized. That is, noise such as diffraction fringes and speckles is reduced.

Figure 11D:
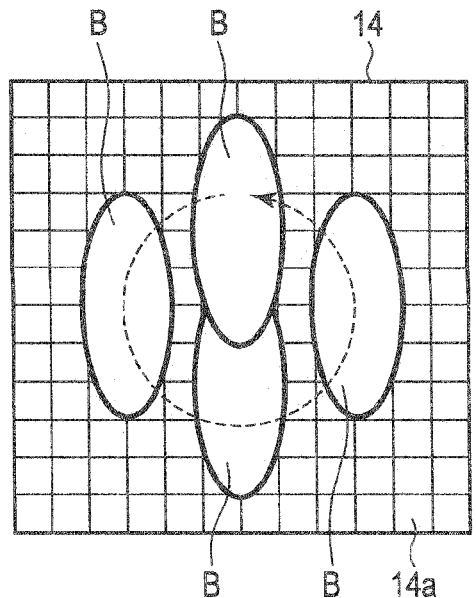

Voltages may be applied to the dielectric elastomers 24A, 24B, 24C, and 24D in this order. For example, the same voltage signal may be applied to the dielectric elastomers 24A, 24B, 24C, and 24D at equal time intervals. That is, the same voltage signal may be applied to the dielectric elastomer 24A with a phase 90 degrees behind the dielectric elastomer 24B, with a phase 180 degrees behind the dielectric elastomer 24C, and with a phase 270 degrees behind the dielectric elastomer 24D. In this case, as shown in FIG. 11*d*, the beam spot B is scanned on the microlens array 14 along a closed curve, for example, a circumference.

As a result, the position of the microlens array 14 where the projected light beam passes continuously changes, so that diffraction fringes and speckles are uniformed, and are thus less visually recognized. That is, noise such as diffraction fringes and speckles is reduced. Moreover, the movement of the beam spot B does not temporarily stop in contrast to the straight reciprocating scanning, and the movement of the beam spot B continues, so that the effect of reducing noise such as diffraction fringes and speckles is improved.

In the example described here, the noise reduction mechanism 20 has the four dielectric elastomers 24A, 24B, 24C, and 24D fixed to the optical element 22, and voltages are applied to these dielectric elastomers 24A, 24B, 24C, and 24D in order, to achieve continuous movement of the beam spot B. However, the noise reduction mechanism may be configured to have three or more dielectric elastomers fixed to the optical element, and current-carrying circuits to apply voltages to these dielectric elastomers, respectively, so that the voltages are applied to these dielectric elastomers in order. In this case as well, the beam spot can scan along the closed curve without temporarily stopping. If the beam spot B is thus circularly moved, the effect of reducing noise such as diffraction fringes and speckles is more improved.

While the embodiments of the present invention have been described so far with reference to the drawings, the present invention is not limited to these embodiments, and various modifications and changes may be made without departing from the spirit thereof. The modifications and changes referred to here cover suitable combinations of the embodiments described above.

Although not clearly stated, the intensity of the voltages applied to the dielectric elastomers may be suitably changed in the embodiments described above. The timing of the application of the voltages to the dielectric elastomers may also be suitably changed. For example, the intensity and time intervals of the voltages applied to the dielectric elastomers may be randomly changed. When the intensity and time intervals of the applied voltages are randomly changed, the regularity of the scanning of the microlens array 14 with the beam spot is reduced, and an improvement in the effect of reducing noise such as diffraction fringes and speckles is expected.

Furthermore, in the first embodiment, the optical element 22 equally moves up and down in the optical axis direction, so that the plane side of the optical element 22 is adhesively bonded to the dielectric elastomers 24A and 24B. However, the present invention is not limited to this configuration, and the curved surface side of the optical element 22 may be adhesively bonded to the dielectric elastomers 24A and 24B as in the second and third embodiments.

Similarly, the dielectric elastomers 24A and 24B separately move up and down in the second embodiment, and the dielectric elastomers 24A, 24B, 24C, and 24D separately move up and down and right and left in the third embodiment, so that the curved surface side of the optical element 22 are adhesively bonded to the dielectric elastomers 24A and 24B. However, the present invention is not limited to this configuration, and the plane side of the optical element 22 may be adhesively bonded to the dielectric elastomers 24A and 24B as in the first embodiment.

Moreover, a diffuser plate may be used instead of the optical element 22.

Although two and four dielectric elastomers 24A, 24B, 24C, and 24D are provided in the embodiments described above, the present invention is not limited to this configuration, and one dielectric elastomer, three dielectric elastomers, or five or more dielectric elastomers may be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
   a light source to emit a light beam;
   an image display element to provide image information to the light beam; and
   a noise reduction mechanism disposed between the light source and the image display element,
   wherein the noise reduction mechanism comprises:
      an optical element to transmit the light beam emitted from the light source;
      a dielectric elastomer fixed to the optical element; and
      first and second electrodes provided on first and second surfaces of the dielectric elastomer, respectively, wherein the dielectric elastomer is deformed in accordance with application of a voltage across the first and second electrodes to move the optical element, and
   wherein:
      the light source includes a laser light source,
      the projection apparatus further comprises a microlens array, disposed between the noise reduction mechanism and the image display element, to convert the light beam into a light beam having a substantially uniform intensity distribution,
      the noise reduction mechanism includes the dielectric elastomer fixed to the optical element, and a current-carrying circuit to apply a voltage to the dielectric elastomer, and
      the current-carrying circuit repeatedly turns on and off the application of the voltage to the dielectric elastomer so that a beam spot formed on the microlens array is scanned.

2. A projection apparatus comprising:
   a light source to emit a light beam;
   an image display element to provide image information to the light beam; and
   a noise reduction mechanism disposed between the light source and the image display element,
   wherein the noise reduction mechanism comprises:
      an optical element to transmit the light beam emitted from the light source;
      two dielectric elastomers fixed to the optical element; and
      on each of the dielectric elastomers, first and second electrodes provided on first and second surfaces of the dielectric elastomer, respectively, wherein the dielectric elastomer is deformed in accordance with application of a voltage across the first and second electrodes to move the optical element, and
   wherein:
      the light source includes a laser light source,
      the projection apparatus further comprises a microlens array, disposed between the noise reduction mechanism and the image display element, to convert the light beam into a light beam having a substantially uniform intensity distribution,
      the noise reduction mechanism includes the two dielectric elastomers fixed to the optical element, and two current-carrying circuits to apply voltages to the two dielectric elastomers, respectively,
      the two dielectric elastomers are arranged symmetrically with respect to the optical element, and
      the two current-carrying circuits repeatedly turn on and off the application of the voltages to the two dielectric elastomers at the same time so that the optical element is repeatedly translated along an optical axis and a beam spot formed on the microlens array is enlarged and reduced.

3. A projection apparatus comprising:
   a light source to emit a light beam;
   an image display element to provide image information to the light beam; and
   a noise reduction mechanism disposed between the light source and the image display element,
   wherein the noise reduction mechanism comprises:
      an optical element to transmit the light beam emitted from the light source;
      two dielectric elastomers fixed to the optical element; and
      on each of the dielectric elastomers, first and second electrodes provided on first and second surfaces of the dielectric elastomer, respectively, wherein the dielectric elastomer is deformed in accordance with application of a voltage across the first and second electrodes to move the optical element, and
   wherein:
      the light source includes a laser light source,
      the projection apparatus further comprises a microlens array, disposed between the noise reduction mechanism and the image display element, to convert the light beam into a light beam having a substantially uniform intensity distribution,
      the noise reduction mechanism includes the two dielectric elastomers fixed to the optical element, and two current-carrying circuits to apply voltages to the two dielectric elastomers, respectively, and
      the two current-carrying circuits alternately and repeatedly turn on and off the application of the voltages to the two dielectric elastomers so that the optical element is repeatedly inclined relative to an optical axis and a beam spot formed on the microlens array is scanned.

4. A projection apparatus comprising:
   a light source to emit a light beam;
   an image display element to provide image information to the light beam; and a noise reduction mechanism disposed between the light source and the image display element, wherein the noise reduction mechanism comprises:
an optical element to transmit the light beam emitted from the light source;
three or more dielectric elastomers fixed to the optical element; and
on each of the dielectric elastomers, first and second electrodes provided on first and second surfaces of the dielectric elastomer, respectively, wherein the dielectric elastomer is deformed in accordance with application of a voltage across the first and second electrodes to move the optical element, and wherein:
the light source includes a laser light source,
the projection apparatus further comprises a microlens array, disposed between the noise reduction mechanism and the image display element, to convert the light beam into a light beam having a substantially uniform intensity distribution,
the noise reduction mechanism includes the three or more dielectric elastomers fixed to the optical element, and three or more current-carrying circuits to apply voltages to the three or more dielectric elastomers, respectively, and
the three or more current-carrying circuits repeatedly turn on and off the application of the voltages to the three or more dielectric elastomers in order so that the optical element is repeatedly inclined relative to an optical axis and a beam spot formed on the microlens array is scanned along a closed curve.

* * * * *